United States Patent
Marom et al.

(10) Patent No.: US 10,417,454 B1
(45) Date of Patent: Sep. 17, 2019

(54) AUTOMATED SECURE OPERATING SYSTEM POLICY INTEGRATION

(71) Applicant: CyberArk Software Ltd., Petach-Tikva (IL)

(72) Inventors: Shlomy Marom, Tel Aviv (IL); Arbel Moshe, Tel Aviv (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

(21) Appl. No.: 15/997,949

(22) Filed: Jun. 5, 2018

(51) Int. Cl.
| | |
|---|---|
| G06F 21/62 | (2013.01) |
| H04L 29/06 | (2006.01) |
| H04L 12/24 | (2006.01) |
| G06F 21/71 | (2013.01) |
| G06F 21/54 | (2013.01) |
| G06F 21/57 | (2013.01) |

(52) U.S. Cl.
CPC .......... *G06F 21/6281* (2013.01); *G06F 21/54* (2013.01); *G06F 21/57* (2013.01); *G06F 21/71* (2013.01); *H04L 63/20* (2013.01); *G06F 2221/2101* (2013.01); *G06F 2221/2149* (2013.01); *H04L 41/28* (2013.01)

(58) Field of Classification Search
CPC ........ H04L 63/20; H04L 63/205; H04L 41/28
See application file for complete search history.

(56) References Cited

U.S. PATENT DOCUMENTS

| | | | | |
|---|---|---|---|---|
| 9,426,178 | B1 * | 8/2016 | Yanovsky | H04L 63/20 |
| 2007/0107043 | A1 * | 5/2007 | Newstadt | H04L 63/102 726/2 |
| 2013/0247128 | A1 * | 9/2013 | Hinchliffe | H04L 63/20 726/1 |
| 2013/0332981 | A1 * | 12/2013 | Paris | G06F 21/00 726/1 |
| 2015/0269383 | A1 * | 9/2015 | Lang | G06F 21/57 726/1 |
| 2016/0099969 | A1 * | 4/2016 | Angus | H04L 63/0876 713/158 |
| 2016/0217286 | A1 * | 7/2016 | Pazdziora | G06F 21/57 |
| 2018/0103064 | A1 * | 4/2018 | Ahuja | H04L 63/20 |
| 2018/0255099 | A1 * | 9/2018 | Chen | H04L 63/20 |

* cited by examiner

*Primary Examiner* — Daniel B Potratz
(74) *Attorney, Agent, or Firm* — Finnegan, Henderson, Farabow, Garrett & Dunner LLP

(57) ABSTRACT

The disclosed embodiments include systems, methods, and computer-readable media configured to automatically perform secure operating system policy integration. Aspects include accessing a database storing a plurality of secure operating system policies corresponding to a plurality of target secure operating system resources, connecting to a first target secure operating system resource from the plurality of target secure operating system resources, automatically providing a customized policy script to the first target secure operating system resource, and receiving a notification from the first target secure operating system resource, the notification being triggered by activity on the first target secure operating system resource that does not comply with the at least one of the plurality of secure operating system policies that has been loaded onto the first target secure operating system resource.

27 Claims, 7 Drawing Sheets

AUTOMATED SECURE OPERATING SYSTEM POLICY INTEGRATION

BACKGROUND

Enterprises are looking to implement the strongest available security for their computer systems and networks while not compromising usability and accessibility. One of the strongest security tools available is SELinux, which is a mechanism for supporting access control security policies. SELinux, or Security-Enhanced Linux, operates at the kernel level of a Linux-based machine. In use, it can potentially label every object in a system for purposes of access control decisions, and can conceptually elevate the system to a more sophisticated security infrastructure. SELinux allows administrators to implement all of the main security paradigms in terms of access control theory. Similar to SELinux, AppArmor also provides kernel-level security features and customizable access-control policies.

To implement SELinux policies, enterprises may connect to a Linux machine, write a policy for the machine, and then compile and load the policy for implementation by the Linux kernel. This is a difficult, time-consuming, slow, and complex process. Moreover, the SELinux policy syntax and audit logs can be difficult to understand. Often, these types of information require parsing tools to interpret and utilize. These problems are compounded if an enterprise has many different SELinux policies to implement concurrently. Consequently, even for organizations that have the capability of utilizing SELinux, they often disable SELinux because of its difficulties.

Moreover, for organizations that do attempt to enable SELinux, the complexity and time-consuming nature of it make implementations imperfect and inefficient. Enterprises may spend considerable time and effort implementing SELinux, only to have considerable wasted time and significant security vulnerabilities. Even for these organizations, therefore, it is difficult to achieve the security advantages of SELinux.

Accordingly, there is a need for technological solutions for improving the security and usability of SELinux and other security-enhanced operating system tools (e.g., AppArmor). Such tools should be customizable, efficient, and enable enterprises to achieve the security benefits that SELinux, AppArmor, and other security-enhanced operating system tools have the promise of offering. Moreover, such tools should be able to operate in modern computing environments involving virtualized processing and distributed architectures.

SUMMARY

The disclosed embodiments include systems, methods, and computer readable media configured to perform automated secure operating system policy integration. As discussed further below, the disclosed embodiments improve security of computer systems by implementing customizable security policies for security-enhanced operating system tools, such as SELinux, AppArmor, and others.

In some disclosed embodiments, a security policy server may be configured to perform operations for automated secure operating system policy integration. The operations may comprise accessing a database storing a plurality of secure operating system policies corresponding to a plurality of target secure operating system resources, the database being maintained remote from the plurality of target secure operating system resources.

The operations may also comprise connecting to a first target secure operating system resource from the plurality of target secure operating system resources.

The operations may further comprise automatically providing a customized policy script to the first target secure operating system resource, the customized policy script enabling the first target secure operating system resource to load at least one of the plurality of secure operating system policies for local use on the first target secure operating system resource, the at least one of the plurality of secure operating system policies being selected for the first target secure operating system resource based on a particular attribute of the first target secure operating system resource.

In addition, the operations may comprise receiving a notification from the first target secure operating system resource, the notification being triggered by activity on the first target secure operating system resource that does not comply with the at least one of the plurality of secure operating system policies that has been loaded onto the first target secure operating system resource.

In additional embodiments, the at least one of the plurality of secure operating system policies is selected for the first target secure operating system resource based on a predictive analysis.

In further embodiments, the predictive analysis includes comparing an identity of the first target secure operating system resource to a plurality of known identities, the plurality of known identities each having an associated secure operating system policy.

In other embodiments, the database includes a mapping of the plurality of known identities to their associated secure operating system policies.

In further embodiments, the notification indicates a portion of the at least one of the plurality of secure operating system policies that the activity does not comply with.

In other embodiments, the notification enables a responsive action to be taken with respect to the activity.

In further embodiments, the particular attribute of the first target secure operating system resource is an operating system performance attribute.

In other embodiments, the particular attribute of the first target secure operating system resource is a security policy requirement associated with the first target secure operating system resource.

In further embodiments, the plurality of target secure operating system resources includes a plurality of SELinux kernel modules.

In other embodiments, the operations further comprise sending a plurality of customized policy scripts to the plurality of target secure operating system resources.

In further embodiments, the plurality of customized policy scripts are configured to enable the plurality of target secure operating system resources to compile one or more of the plurality of secure operating system policies.

In other embodiments, the plurality of customized policy scripts are configured to enable the plurality of target secure operating system resources to load one or more of the plurality of secure operating system policies to operating system kernels of the plurality of target secure operating system resources.

In further embodiments, the operations further comprise receiving an update from an identity to at least one of the plurality of secure operating system policies.

In other embodiments, the operations further comprise translating the at least one of the plurality of secure operating system policies for implementation on the first target secure operating system resource.

In further embodiments, the translating includes translating a human-readable version of the at least one of the plurality of secure operating system policies to an SELinux version of the at least one of the plurality of secure operating system policies.

In other embodiments, the security policy server is one of a plurality of decentralized security policy servers, each of the plurality of decentralized security policy servers having access to at least some of the plurality of secure operating system policies.

In further embodiments, each of the plurality of decentralized security policy servers has access to each of the plurality of secure operating system policies.

Additional embodiments include a computer-implemented method for automated secure operating system policy integration. The method may comprise accessing a database storing a plurality of secure operating system policies corresponding to a plurality of target secure operating system resources, the database being maintained remote from the plurality of target secure operating system resources.

In addition, the method may comprise connecting to a first target secure operating system resource from the plurality of target secure operating system resources.

Further, the method may comprise automatically providing a customized policy script to the first target secure operating system resource, the customized policy script enabling the first target secure operating system resource to load at least one of the plurality of secure operating system policies for local use on the first target secure operating system resource, the at least one of the plurality of secure operating system policies being selected for the first target secure operating system resource based on a particular attribute of the first target secure operating system resource.

The method may also comprise receiving a notification from the first target secure operating system resource, the notification being triggered by activity on the first target secure operating system resource that does not comply with the at least one of the plurality of secure operating system policies that has been loaded onto the first target secure operating system resource.

In some embodiments, the notification is received at a security policy server for determining whether to alert an identity to the notification.

In further embodiments, the method comprises sending a message to the identity based on the notification.

In other embodiments, the method comprises sending an alert to the identity through a dedicated communication channel based on the notification.

In additional embodiments, the identity is associated with the first target secure operating system resource.

In further embodiments, the method comprises sending an audit of activity from the first target secure operating system resource to an identity associated with the first target secure operating system resource.

In additional embodiments, the method comprises investigating, based on the notification, activity of the first target secure operating system resource to determine a pattern of activity.

In other embodiments, the method comprises providing a new customized policy script to the first target secure operating system resource, the new customized policy script enabling the first target secure operating system resource to load a new policy from the plurality of secure operating system policies for local use on the first target secure operating system resource.

In further embodiments, the method comprises identifying a second target secure operating system resource, the second target secure operating system resource having been spun up in a computing environment.

In other embodiments, the method comprises identifying an applicable secure operating system policy that has been provided to a target secure operating system resource similar to the second target secure operating system resource, and providing a customized policy script associated with the applicable secure operating system policy to the second target secure operating system resource.

It is to be understood that both the foregoing general description and the following detailed description are exemplary and explanatory only and are not restrictive of the disclosed embodiments as defined in the claims.

BRIEF DESCRIPTION OF DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The disclosed embodiments provide improved techniques for integrating policies on secure operating system resources and, more particularly, systems, methods, and computer readable media for automated secure operating system policy integration. The described systems, methods, and computer readable media may integrate policies into secure operating system resources, such as SELinux resources, AppArmor resources, and other types of security-enhanced operating system resources.

Reference will now be made in detail to exemplary disclosed embodiments, examples of which are illustrated in the accompanying drawings and disclosed herein. Where convenient, the same reference numbers will be used throughout the drawings to refer to the same or like parts.

Figure 1:
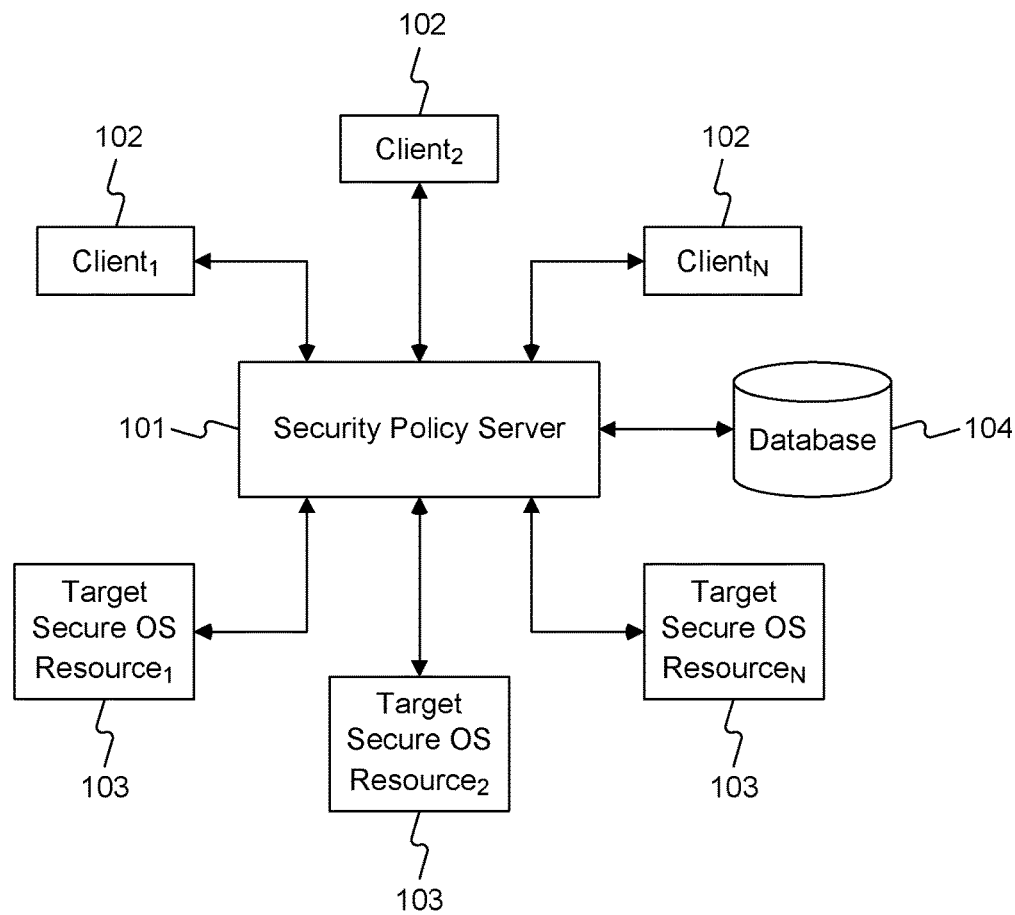
FIG. 1 is a schematic diagram of an exemplary system for automated secure operating system policy integration in accordance with disclosed embodiments.

FIG. 1 shows a diagram of an exemplary system 100 for automated secure operating system policy integration in accordance with disclosed embodiments, as discussed further below. The system 100 may comprise various components, including one or more client identities or machines 102, which may be various types of computer identities or computing devices.

As described herein, an identity associated with a client 102 may be any account, person, or entity, such as a database, server, storage device, etc. An identity may be, for example, a local account on a computer or computer system that is established according to a particular operating system (e.g., Microsoft Windows®, Mac OS®, UNIX, etc.), a particular security service, or another service or protocol governing the computer or computer system. An identity may also be a network account, such as an account established according to a network operating system (e.g., a Microsoft® network operating system, a Cisco® network operating system, a Dell® network operating system, a Linux network operating system, etc.). Further, network account identities may be established based on network security protocols or services. In addition, client 102 may be an instance of a virtual machine or container running in a cloud computing environment. Client 102 may also be a token used to identify a particular computing resource, person, account, virtual machine, container, serverless code, a micro service, or an application accessing a computer or network.

As described herein, computing devices associated with a client 102 may include personal computers, laptops, web servers, general-purpose servers, authentication servers, mobile computing devices (e.g., smartphones), tablets, IoT devices, wearable computer devices, automotive computer devices, smart home appliances, etc. As discussed further below, such computing devices may include hardware processors and memories for storing data and/or software instructions.

Figure 2:
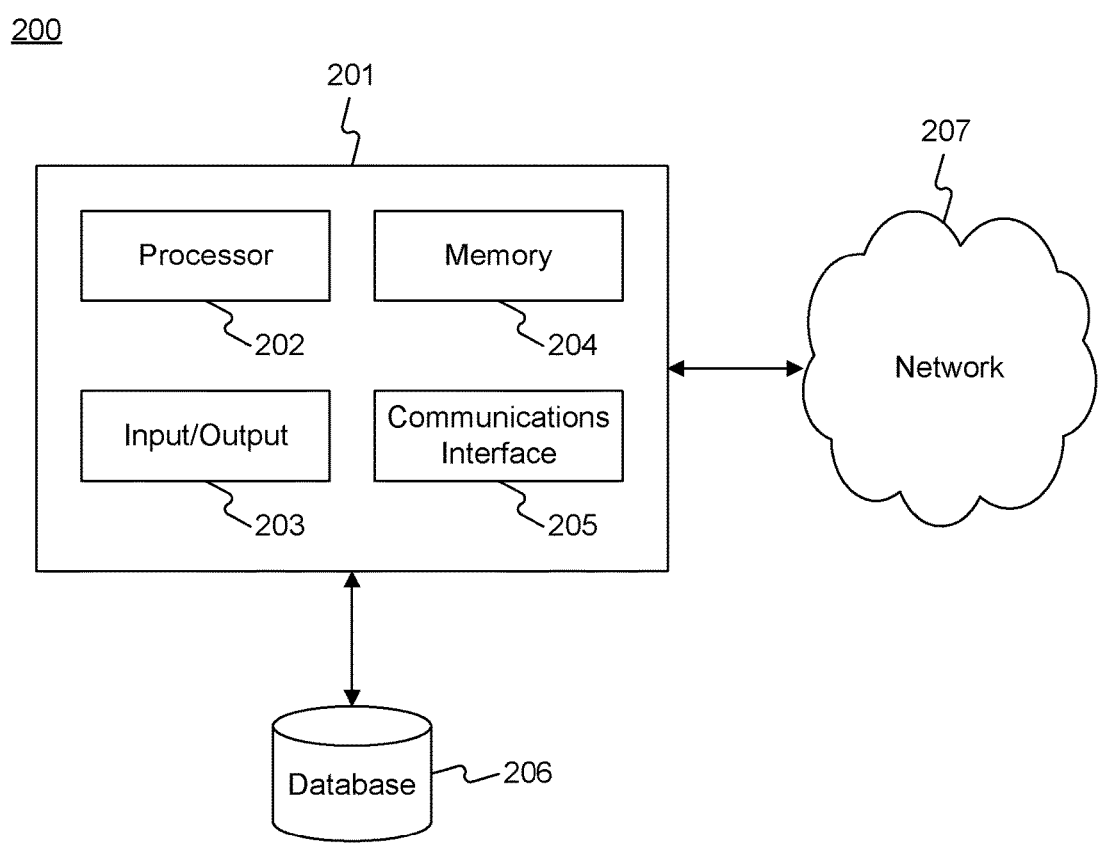
FIG. 2 is a schematic diagram of an exemplary computing device in accordance with disclosed embodiments.

In some embodiments, the system 100 may also include one or more security policy server 101. The security policy server 101 may be in communication with clients 102 through a network, as discussed further in connection with FIG. 2. In general, the security policy server 101 maintains rules, which may be organized into policies of multiple rules, for one or more different target secure operating system resources 103. The rules or policies may be stored and organized in a database, such as database 104. In some embodiments, the rules or policies are organized in the database 104 based on the specific target secure operating system resource 103 to which they apply. In other embodiments, the rules or policies are organized based on groups, classes, or collections of target secure operating system resources 103. Each specific target secure operating system resource 103 may be represented in the database based on, for example, an IP address, MAC address, cloud environment identifier, identity name, identity group or class name, timestamp, etc.

As discussed further below, the security policy server 101 may maintain the rules or policies in a format accessible to users, and may be configured to translate them into a format implementable on target secure operating system resources 103 (e.g., an SELinux format, AppArmor format, or other security-enhanced operating system module format). The security policy server 101 may be configured to communicate with target secure operating system resources 103 through a variety of secure connection techniques, such as SSH (secure shell), PuTTY, RDP (Remote Desktop Protocol), Chrome Remote Desktop, Remmina, etc. Through such a secure connection, the security policy server 101 may provide policies or policy updates to target secure operating system resources 103, and may also monitor the activity of target secure operating system resources 103. In addition, as discussed below, both security policy server 101 and target secure operating system resources 103 may include other communications interfaces (e.g., email, MMS, HTTP, etc.) for communicating activity notifications (e.g., policy violations on target secure operating system resources 103).

As discussed further below, the security policy server 101 may be configured to provide reports to clients 102 regarding activity on target secure operating system resources 103. For example, when a security policy violation on a target secure operating system resource 103 is detected, the security policy server 101 may provide a report or notification to one or more clients 102. Different clients 102 may register to receive different alerts from target secure operating system resources 103 (e.g., from particular target secure operating system resources 103, for particular types of alerts, for particular types of policy violations, for particular identities interacting with target secure operating system resources 103, etc.). Such reports or notifications may be provided by the security policy server 101 to clients 102 in real-time, in near real-time, or on a periodic basis (e.g., per-minute, hourly, daily, etc.). Further, in some embodiments clients 102 may connect to the security policy server 101 to inquire about activity (e.g., policy violations) on specific target secure operating system resources 103 or on all target secure operating system resources 103 collectively. In some embodiments, the security policy server 101 may store historical or current information regarding activity (e.g., policy violations) on target secure operating system resources 103 in database 104. In other embodiments, the security policy server obtains such information from target secure operating system resources 103 on an as-needed basis (e.g., based on requests from clients 102).

In some embodiments, the security policy server 101 may actually be several different servers that are organized in a decentralized, distributed architecture. In such embodiments, each decentralized security policy server 101 may include a ledger, which may contain a copy of secure operating system policies for target secure operating system resources $R_1$, $R_2$, or $R_N$ 103 and/or a copy of each transaction or instance of activity involving a target secure operating system resource $R_1$, $R_2$, or $R_N$ 103. In such an embodiment, similar to blockchain functionality, each security policy server 101 may independently contain such a ledger, which may be used by any target secure operating system resource $R_1$, $R_2$, or $R_N$ 103 at any given time. In this manner, a secure and trusted version of the applicable policy for each target secure operating system resource $R_1$, $R_2$, or $R_N$ 103 and/or the activity records of each target secure operating system resource $R_1$, $R_2$, or $R_N$ 103 may be tracked and used. Alternatively, in some embodiments the decentralized security policy servers 101 may be grouped, such that each contains the policies for a subset of all target secure operating system resources $R_1$, $R_2$, or $R_N$ 103. For example, one group of decentralized security policy servers 101 may be responsible for storing policies for target secure operating system resources $R_1$, $R_2$, or $R_N$ 103 that are website servers, while another group of decentralized security policy servers 101 may be responsible for storing policies for secure database resources, and another group of decentralized security policy servers 101 may be responsible for storing policies for software development resources, etc.

The target secure operating system resources $R_1$, $R_2$, or $R_N$ 103 depicted in FIG. 1 may be any of various types of computing resources that have a security-enhanced operating system module (e.g., SELinux, AppArmor, etc.) installed on them. SELinux is an example of such a security-enhanced operating system tool, which operates at the kernel level on a target resource. As discussed further below, the security-enhanced operating system modules on target secure operating system resources $R_1$, $R_2$, or $R_N$ 103 may support access-control policies that limit the operations that they may perform, or that identities may perform on them. The target secure operating system resources $R_1$, $R_2$, or $R_N$ 103 may be various types of computing resources, such as secure personal computers, laptops, web servers, mainframes, authentication servers, mobile computing devices (e.g., smartphones), tablets, IoT devices, wearable computer devices, automotive computer devices, smart home appliances, etc. The security-enhanced operating system tool (e.g., SELinux, AppArmor, etc.) running on such resources may provide for configurable access-control settings, which may be controlled by the various types of policies described further below.

FIG. 8 depicts a schematic diagram 200 of an exemplary computing device 201 in accordance with disclosed embodiments. In various embodiments, the computing device may connect through a network 207 to other computing devices (e.g., clients 102, security policy server 101, or database 104, from FIG. 1). Computing device 201 may be an implementation of a client 102 or security policy server 101 of FIG. 1, as discussed above. Accordingly, computing device 201 may be a personal computer, laptop, web server, general-purpose server, authentication server, mobile computing device (e.g., smartphone), tablet, IoT device, wearable computer device, automotive computer device, smart home appliance, etc.

In some embodiments, computing device 201 may have one or more processors 202, one or more memories 204, one or more input/output (I/O) devices 203, and one or more communications interfaces 205. As discussed above, computing device 201 may take the form of a mobile computing device, a personal computer, a mainframe computer, a server, or any combination of these components. Alternatively, computing device 201 may be configured as a particular apparatus, embedded system, dedicated circuit, or the like based on the storage, execution, and/or implementation of the software instructions that perform one or more operations in accordance with the disclosed embodiments. In some embodiments, computing device 201 may be a system-on-a-chip (SoC). Furthermore, computing device 201 may be a stand-alone system, or it may be implemented as a subsystem in a larger system, where one or more operations of computing device 201 are performed using parts of the larger system.

Processor(s) 202 may include one or more data or software processing devices. For example, the processor(s) 202 may take the form of, but are not limited to, a microprocessor, embedded processor, or the like, or alternatively, the processor(s) 202 may be integrated in an SoC. Furthermore, according to some embodiments, the processor(s) 202 may be from the family of processors manufactured by Intel®, AMD®, Qualcomm®, Apple®, NVIDIA®, or the like. The processor(s) 202 may also be based on the ARM architecture, a mobile processor, or a graphics processing unit, etc. The disclosed embodiments are not limited to any type of processor configured in the computing device 201.

Memory(ies) 204 may include one or more storage devices configured to store instructions used by the processor(s) 202 to perform functions related to the disclosed embodiments. For example, the memory 204 may be configured to store software instructions, such as programs, that perform one or more operations when executed by the processor(s) 202 to manage policies for target resources (e.g., SELinux resources, AppArmor resources, etc.). The disclosed embodiments are not limited to software programs or devices configured to perform dedicated tasks. For example, the memory 204 may include a single program, such as a user-level application, that performs the functions of the disclosed embodiments, or may comprise multiple software programs. Additionally, the processor 202 may execute one or more programs (or portions thereof) remotely located from the computing device 201. Furthermore, the memory 204 may include one or more storage devices configured to store data for use by the programs. In addition to memory 204, computing device 201 may have access to database 206. Similar to database 104 of FIG. 1, database 206 may store rules or policies for deployment on target resources (e.g., SELinux resources, AppArmor resources, etc.).

Input/output devices 203 may include one or more integrated ports or stand-alone devices configured to allow data to be received and/or transferred by the computing device 201. In some embodiments, the I/O devices 203 may comprise a touchscreen configured to allow a user to interact with the computing device 201, and in some embodiments, the I/O devices 203 may comprise a keyboard, mouse, trackball, touch pad, stylus, and the like. The I/O devices 203 may include one or more communication devices and/or interfaces (e.g., WiFi, Bluetooth®, RFID, NFC, RF, infrared, etc.) to communicate with other machines and devices, such as the components in the system 200. I/O devices 203 may also comprise sensors, such as gyroscopes, accelerometers, thermometers, cameras, scanners, etc.

Computing devices 201 in the system 200 may be configured to communicate with one or more components in the system 200 via a network 207. The network 207, in some embodiments, may comprise one or more interconnected wired or wireless data networks. In one aspect, the network 207 may comprise any type of computer networking arrangement used to exchange data. For example, the network 207 may be implemented using the Internet, a wired Wide Area Network (WAN), a wired Local Area Network (LAN), a wireless WAN (e.g., WiMAX), a wireless LAN (e.g., IEEE 802.11, Bluetooth, etc.), a mobile network, a private data network, a virtual private network using a public network, and/or other suitable connection (e.g., NFC, infrared, etc.) that enables the system 200 to send and receive information between the components in the system 200. In some embodiments, computing devices 201 may connect through network 207 to other computing devices in the system 200 (e.g., clients 102, security policy server 101, or database 104, from FIG. 1).

It is to be understood that the configurations and boundaries of the functional building blocks shown for exemplary systems 100 and 200 have been generally described herein for the convenience of the description. Alternative implementations may be used so long as the specified functions and relationships thereof are appropriately performed and fall within the scope and spirit of the various embodiments, as discussed further below.

Figure 3:
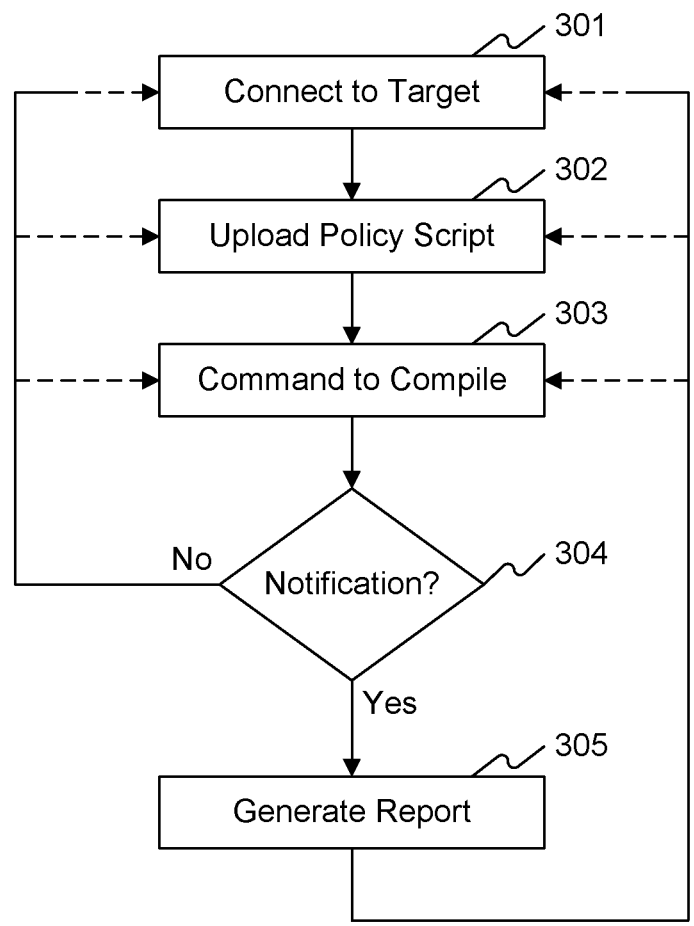
FIG. 3 is a depiction of an exemplary process for uploading and monitoring policy scripts on target resources in accordance with disclosed embodiments.

FIG. 3 illustrates an exemplary process 300 for uploading and monitoring policy scripts on target resources in accordance with disclosed embodiments. For example, the process 300 of FIG. 3 may be practiced by the security policy server 101 of FIG. 1 using the components depicted in FIG. 2.

In accordance with process 300, in operation 301 the security policy server 101 may connect to a target resource, such as target secure operating system resource $R_1$, $R_2$, or $R_N$ 103, as shown in FIG. 1. In some embodiments, the security policy server 101 may connect to a target secure operating system resource 103 through a secure connection technique such as SSH (secure shell), PuTTY, RDP (Remote Desktop Protocol), Chrome Remote Desktop, Remmina, etc. This may involve the security policy server 101 authenticating itself to the target secure operating system resource $R_1$, $R_2$, or $R_N$ 103, the target secure operating system resource $R_1$, $R_2$, or $R_N$ 103 authenticating itself to the security policy server 101, or either or both resource authenticating itself at a different resource (e.g., a CyberArk Vault™). In some embodiments, connecting to the target secure operating system resource $R_1$, $R_2$, or $R_N$ 103 may also involve logging on to the target secure operating system resource $R_1$, $R_2$, or $R_N$ 103 (e.g., through use of a password, token, certificate, or other information).

In operation 302, once the security policy server 101 has connected to the target secure operating system resource $R_1$, $R_2$, or $R_N$ 103, it may upload a policy to the target secure operating system resource $R_1$, $R_2$, or $R_N$ 103. In some embodiments, the policy may be provided to the target secure operating system resource $R_1$, $R_2$, or $R_N$ 103 in the form of a data (e.g., text) file, a database record, an executable script, etc. For example, if the policy is provided in a data or database format, the target secure operating system resource $R_1$, $R_2$, or $R_N$ 103 may be configured to store the policy locally and access it for making access-control decisions. If the policy is provided as an executable script, the script may be configured to install or compile the policy on the target secure operating system resource $R_1$, $R_2$, or $R_N$ 103 for use. Accordingly, if the policy is provided as a script, the script may execute in an operation 303 to install or compile the policy on the target secure operating system resource $R_1$, $R_2$, or $R_N$ 103.

In various embodiments, operations 302 and/or 303 may involve translating the policy (or a portion thereof) into a format compatible with the security-enhanced tool being used on the target secure operating system resource $R_1$, $R_2$, or $R_N$ 103. For example, if the policy is written a current module language (CML) or another human-readable language, it may be translated into SELinux Common Intermediate Language (CIL), and then translated once more into the low-level kernel language of the resource. Similarly, if the policy is written in CIL, it may be translated into the low-level kernel language of the resource. Depending on the embodiment, the translation(s) may occur at the security policy server 101 or at the target secure operating system resource $R_1$, $R_2$, or $R_N$ 103. In embodiments where the policy is provided as a script, for example, the script may perform the translation or may instruct the target secure operating system resource $R_1$, $R_2$, or $R_N$ 103 to perform the translation. Further, different security-enhanced operating systems tools may involve different types of policy translations. For example, SELinux-based target resources 103 and AppArmor-based target resources 103 may require the same (or similar) policy to be translated differently for implementation on each resource. Accordingly, in some cases a single plugin (e.g., running at security policy server 101) may be configured to translate policies into different security-enhanced operating system tool languages, and in other embodiments different plugins could be used to perform the different translations. If there is ever a conflict in a decision made by different plugins, or by different security-enhanced operating system tools (e.g., SELinux and AppArmor), the conflict may be resolved by querying a trusted source (e.g., a CyberArk Vault™) for a determinative decision (e.g., access granted or denied).

Once the policy has been provided to the target secure operating system resource $R_1$, $R_2$, or $R_N$ 103, the target secure operating system resource $R_1$, $R_2$, or $R_N$ 103 may operate with the policy. Thus, the target secure operating system resource $R_2$, or $R_N$ 103 may perform its designed function, which may be numerous different operations as discussed above, such as functioning as a secure server, database, IoT device, smart appliance, etc. Based on the policy, the target secure operating system resource $R_1$, $R_2$, or $R_N$ 103 may determine whether certain functions are in compliance with the policy or not. For example, the policy may require that the target secure operating system resource $R_1$, $R_2$, or $R_N$ 103 only communicate with a specific, designated IP address. If the target secure operating system resource $R_1$, $R_2$, or $R_N$ 103 communicates (or attempts to communicate) with an IP address other than the one required, a policy violation may be declared. Similarly, the policy may be configured to allow write and delete access to data records only to specific pre-approved identities (e.g., administrator identities). If the target secure operating system resource $R_1$, $R_2$, or $R_N$ 103 performs (or attempts to perform) write or delete access at the command of any other identity, a policy violation may be declared.

In an operation 304, the security policy server 101 may be configured to receive a notification or alert from the target secure operating system resource $R_1$, $R_2$, or $R_N$ 103. The notification may be of various types, such as a confirmation of policy-compliant activity on the target secure operating system resource $R_1$, $R_2$, or $R_N$ 103, policy-violative activity on the target secure operating system resource $R_1$, $R_2$, or $R_N$ 103, idle time or non-use of the target secure operating system resource $R_1$, $R_2$, or $R_N$ 103, etc. In some embodiments, the target secure operating system resource $R_1$, $R_2$, or $R_N$ 103 is configured (e.g., through the script provided in operation 302) to push the notification to the security policy server 101. This may occur, for example, upon the occurrence of a specific event on the target secure operating system resource $R_1$, $R_2$, or $R_N$ 103 (e.g., policy violation, policy compliance, etc.). Further, this may occur periodically (e.g., every minute, hour, day, week, etc.) or in response to a specific request (e.g., a request from a client 102). In other embodiments, the security policy server 101 may be configured to pull the notification from the target secure operating system resource $R_1$, $R_2$, or $R_N$ 103. For example, the security policy server 101 may be configured to periodically, or upon a request (e.g., from a client 102), request notifications from the target secure operating system resource $R_1$, $R_2$, or $R_N$ 103.

The notifications provided by the target secure operating system resource $R_1$, $R_2$, or $R_N$ 103 may indicate various types of information regarding activity on the target secure operating system resource $R_1$, $R_2$, or $R_N$ 103. Examples of such information include an IP address or MAC address of the target secure operating system resource $R_1$, $R_2$, or $R_N$ 103, timestamp, policy or policy rule violated, policy or policy rule complied with, an identity accessing or being accessed by the target secure operating system resource $R_1$, $R_2$, or $R_N$ 103, policy version, activity being performed by the target secure operating system resource $R_1$, $R_2$, or $R_N$ 103 at the time of the policy violation or compliance, activity being performed by the target secure operating system resource $R_1$, $R_2$, or $R_N$ 103 prior to the policy violation or compliance, security-enhanced operating system module version, etc. Notifications may also include fewer or additional information.

When the security policy server 101 receives a notification from the target secure operating system resource $R_1$, $R_2$, or $R_N$ 103, the security policy server 101 may generate a report in an operation 305. In some embodiments, the report may be sent through a communications interface (e.g., communications interface 205, of FIG. 2) to one or more clients 102, as shown in FIG. 1. As discussed above, the communications may be sent through a remote connection (e.g., SSH, PuTTY, RDP, Chrome Remote Desktop, Remmina, etc.), email, HTTP, SMS, etc. Clients 102 may request such reports from the security policy server 101 on an ad hoc basis, or may be configured to automatically request reports periodically. Alternatively, the security policy server 101 may be configured to send such reports to clients 102 when they are received, or to send them periodically to clients 102. In some embodiments, the security policy server 101 may also store copies of the notifications, or information regarding the notifications, as audit records in a database (e.g., database 104 or 206).

Figure 4:
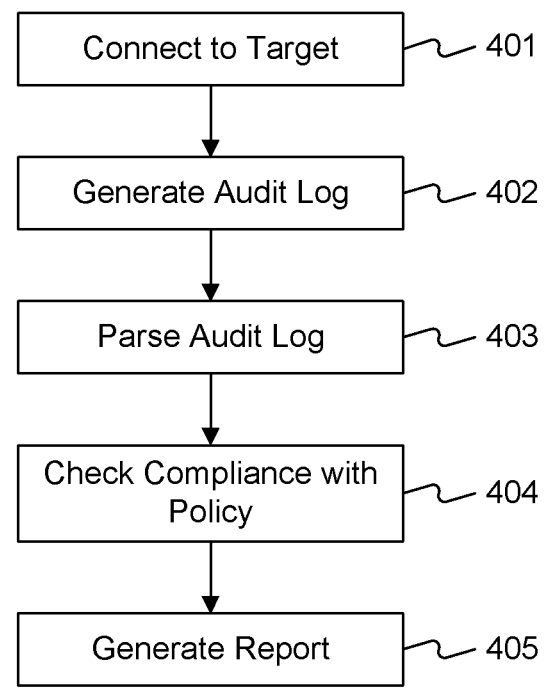
FIG. 4 is a depiction of an exemplary process for analyzing audit logs from target resources in accordance with disclosed embodiments.

FIG. 4 illustrates an exemplary process 400 for analyzing audit logs from target resources in accordance with disclosed embodiments. For example, the process 400 of FIG. 4 may be practiced by the security policy server 101 of FIG. 1 using the components depicted in FIG. 2.

Process 400 may involve an operation 401 of connecting to a target secure operating system resource, such as resources $R_1$, $R_2$, or $R_N$ 103 or FIG. 1. As discussed above in connection with FIG. 3, this may involve security policy server 101 connecting through a secure connection technique (e.g., SSH, PuTTY, RDP, Chrome Remote Desktop, Remmina, etc.), and potentially authenticating itself to the target secure operating system resource $R_1$, $R_2$, or $R_N$ 103, the target secure operating system resource $R_1$, $R_2$, or $R_N$ 103 authenticating itself to the security policy server 101, or either or both resource authenticating itself at a different resource (e.g., a CyberArk Vault™). Operation 401 may also involve logging on to the target secure operating system resource $R_1$, $R_2$, or $R_N$ 103 (e.g., through use of a password, token, certificate, or other information).

Once the security policy server 101 has connected to a target secure operating system resource $R_1$, $R_2$, or $R_N$ 103, an audit log may be generated in operation 402. Alternatively, in some embodiments the audit log may be generated independent of the security policy server 101 having connected to a target secure operating system resource $R_1$, $R_2$, or $R_N$ 103. As discussed above, the audit log may be created by the target secure operating system resource $R_1$, $R_2$, or $R_N$ 103 and stored in a database (e.g., database 206), or may be created by the security policy server 101 and stored in a database (e.g., database 104 or 206).

In an operation 403, process 400 may involve parsing the audit log to extract or summarize relevant information. For example, the security policy server 101 may search the audit log to identify all policy violations involving a target secure operating system resource $R_1$, $R_2$, or $R_N$ 103. As another example, the security policy server may search for all access denials performed by the target secure operating system resource $R_1$, $R_2$, or $R_N$ 103 based on a policy. Further, the security policy server 101 may search for all policy violations, or access denials, involving a specific rule from a policy that encompasses multiple rules.

In additional embodiments, parsing the audit log may involve extracting activity information from the log, and then performing an assessment of whether the activity violates a particular policy (e.g., a policy stored in database 104 or 206) in an operation 404. In this manner, policies may be tested and optimized with actual activity data from a target secure operating system resource $R_1$, $R_2$, or $R_N$ 103. If a policy is deemed to be creating false-positives (e.g., declaring policy violations when a target secure operating system resource $R_1$, $R_2$, or $R_N$ 103 performs actions that are not deemed unsecure), the policy may be revised to allow such actions. Conversely, if a policy is deemed to be creating false-negatives (e.g., omitting to declare policy violations when unsecure actions are taken by the target secure operating system resource $R_1$, $R_2$, or $R_N$ 103), the policy may be updated to prohibit such actions. If updates to a policy are created, the updated policy may be sent to the target secure operating system resource $R_1$, $R_2$, or $R_N$ 103 for use, as discussed above.

Similar to process 300, process 400 may also involve generating a report in an operation 405. As discussed above in connection with FIG. 3, this may involve sending a report to a client 102, either on an ad hoc basis or periodically. Reports may be sent from the security policy server 101 to clients 102 that have requested such reports, or that have subscribed to receiving reports from one or more target secure operating system resources $R_1$, $R_2$, or $R_N$ 103.

Figure 5:
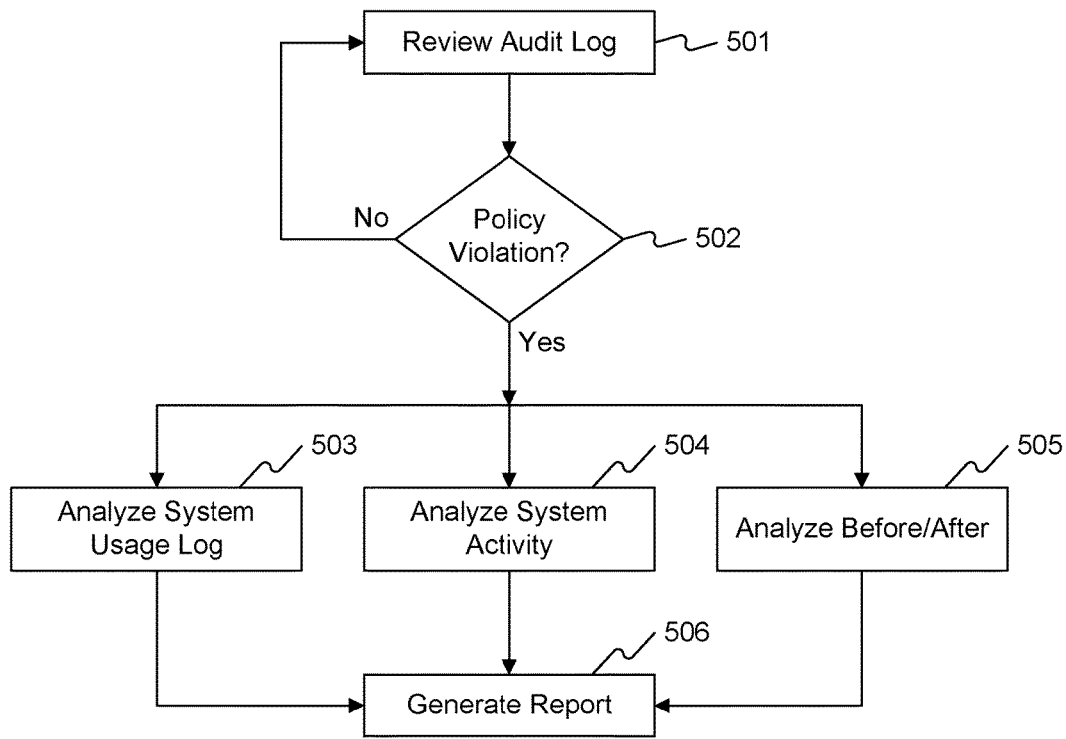
FIG. 5 is a depiction of an exemplary process for responding to potential policy violations on target resources in accordance with disclosed embodiments.

FIG. 5 illustrates an exemplary process 500 for responding to potential policy violations on target resources in accordance with disclosed embodiments. The process 500 of FIG. 5 may be practiced, for example, by the security policy server 101 of FIG. 1 using the components depicted in FIG. 2.

In an operation 501, the security policy server 101 may review the audit log generated by the security policy server 101 or target secure operating system resource $R_1$, $R_2$, or $R_N$ 103. As discussed above, the audit log may be stored in the database 104 or 206, or may be transmitted to the security policy server 101 from target secure operating system resource $R_1$, $R_2$, or $R_N$ 103. The audit log may contain raw activity data involving target secure operating system resource $R_1$, $R_2$, or $R_N$ 103 or may include summaries of such data.

In an operation 502, the security policy server 101 may determine whether the audit log reflects any policy violations. For example, one or more applicable polices for a target secure operating system resource $R_1$, $R_2$, or $R_N$ 103 may be stored in a database 104 or 206 and may be accessed by the security policy server 101. The security policy server 101 may determine whether a policy, or any specific rule within a policy, has been violated based on the audit data. As discussed above, policy violations may involve numerous types of activities by target secure operating system resources $R_1$, $R_2$, or $R_N$ 103, such as connection activity, reading activity, writing activity, deleting activity, copying activity, moving activity, activities specific to particular identities, activities occurring at particular times, etc.

Based on a policy violation being detected, one or more of operations 503, 504, or 505 may be performed as a responsive measure. Alternatively, operations 503, 504, or 505 may be performed based on a notification of a policy violation, as described above in connection with operation 304 of FIG. 3.

Operation 503 may involve analyzing a system usage log associated with the target secure operating system resource $R_1$, $R_2$, or $R_N$ 103 that has the associated policy violation. For example, a system usage log may identify what identities were connected to the target secure operating system resource $R_1$, $R_2$, or $R_N$ 103 at the time of the policy violation, what time the violation occurred, the IP address or MAC address of the identity, what other activities were being taken concurrently by the identity, what other applications or processes the identity was running concurrently with the violation, keystroke activity of the identity on a machine concurrently with the violation, etc. Similarly, operation 504 may involve gathering system activity information regarding the target secure operating system resource $R_1$, $R_2$, or $R_N$ 103. This may include an IP address or MAC address of the target secure operating system resource $R_2$, or $R_N$ 103, other applications or processes being run by the target secure operating system resource $R_1$, $R_2$, or $R_N$ 103, and other connections made concurrently by the target secure operating system resource $R_1$, $R_2$, or $R_N$ 103.

Operation 505 may involve analyzing information regarding activities of the target secure operating system resource $R_1$, $R_2$, or $R_N$ 103 or identity associated with the policy violation just before, and/or just after, the violation. For example, this may involve analyzing connections attempted or made by the target secure operating system resource $R_1$, $R_2$, or $R_N$ 103 or identity before or after the policy violation, read/write/copy/delete/move operations attempted or made before or after the violation, other applications or processes being run by the target secure operating system resource $R_1$, $R_2$, or $R_N$ 103 or identity before or after the violation, keystroke analysis on a machine associated with the identity before or after the violation, etc.

In some embodiments, the information analyzed in operations 503, 504, or 505 may further be compared to regular usage information associated with the target secure operating system resource $R_1$, $R_2$, or $R_N$ 103 or the identity. For example, an identity may regularly log in to specific types of machines at the same time of day to try to edit a file, but may be blocked from doing so by the policy with respect to a particular type of file. In that event, the security policy server 101 may analyze whether the particular type of file is considered to be related to other files that the identity was already allowed to edit. If so, the alert may be deemed a false-alarm, and in that situation the security policy server 101 may automatically deploy a new policy to the target secure operating system resource $R_1$, $R_2$, or $R_N$ 103 that removes the false-alarm. Accordingly, the next time the identity requests the same operation for the particular file, it would be allowed seamlessly. As another example, a policy for a target secure operating system resource $R_1$, $R_2$, or $R_N$ 103 may prohibit an identity from accessing a particular virtual machine spun up in a cloud environment. But if another duplicate or similar virtual machine is spun up later (e.g., through a scaling process), the policy may not explicitly prohibit the identity from accessing the newly spun up virtual machine. In that case, if the security policy server 101 determines that the newly spun up virtual machine is identical or similar to the previously prohibited virtual machine (e.g., based on data from a cloud orchestration or management tool), the policy may be updated to prohibit the identity from accessing the newly spun up virtual machine.

In additional embodiments, patterns of activity involving target secure operating system resources $R_1$, $R_2$, or $R_N$ 103 may be determined. For example, target secure operating system resources $R_1$, $R_2$, or $R_N$ 103 may have a certain sequence of steps, involving authenticating themselves to a database, accessing the database, and updating certain records in the database. Such patterns of activity may be reflected in a policy for the target secure operating system resource $R_1$, $R_2$, or $R_N$ 103 that permits the pattern of activity to occur. But when a target secure operating system resource $R_1$, $R_2$, or $R_N$ 103 is determined to engage in a different pattern (e.g., access the database without authentication, or attempt to delete records rather than update them), a policy violation may be detected.

Following any one or multiple of operations 503, 504, and 505, process 500 may continue to generate a report in an operation 506. As discussed above regarding processes 300 and 400, process 500 may involve sending a report or alert to a client 102, either on an ad hoc basis or periodically. Reports or alerts may be sent from the security policy server 101 to clients 102 that have requested such reports or alerts, or that have subscribed to receiving reports or alerts from one or more target secure operating system resources $R_1$, $R_2$, or $R_N$ 103.

Figure 6:
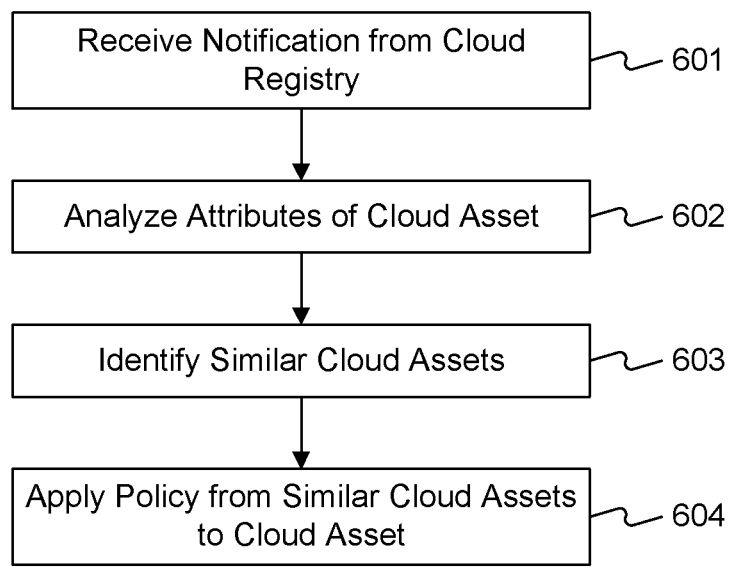
FIG. 6 is a depiction of an exemplary process for applying policies to similar target resources in accordance with disclosed embodiments.

FIG. 6 illustrates an exemplary process 600 for applying policies to similar target resources (e.g., through predictive analysis or learning) in accordance with disclosed embodiments. The process 600 of FIG. 6 may be practiced, for example, by the security policy server 101 of FIG. 1 using the components depicted in FIG. 2.

In some embodiments, process 600 may include an operation 601 of receiving a notification from a cloud registry of one or more new resources that are spun up, uploaded, or initialized in a cloud environment. As an example, the notification may come from a cloud orchestration tool, such as Amazon Web Services CloudFormation™, Cisco Cloud Center™, IBM Cloud Orchestrator™, Microsoft Azure Automation™, OpenStack™, Dell Cloud Manager™, Kubernetes (K8S)™, OpenShift™, Docker™, Ansible™, Puppet™, Chef™, or others. Depending on the nature of the cloud resource being spun up, uploaded, or initialized, the notification may contain various different types of information. For example, the notification may identify the cloud resource by a unique identifier, may specify a class or group to which the resource belongs, may identify the resource as one of several copies of the same resource (e.g., based on a scaling operation), may identify a security level or tier of the resource, may identify security privileges of the resource, may identify permitted or prohibited functions of the resource, etc. As discussed further below, the cloud resource may operate in a public, private, or hybrid public-private cloud architecture. Further, the cloud resource may also be, in alternative embodiments, an on-premises or local network computing resource.

In an operation 602, these various types of information regarding the cloud resource may be analyzed, and in an operation 603 similar cloud resources may be identified. For example, if a newly spun up docker container is determined in operation 602 to belong to security tier 1, which is the highest level security tier and signifies the highest level of sensitivity, operation 603 may involve identifying all other docker containers with the same security tier 1 level. As another example, if a virtual machine is determined in operation 602 to be one among a group of 1,000 spun up virtual machines that are duplicates of each other, the other 999 virtual machines in the same group may be deemed similar in operation 603. As a further example, if a docker container is identified in operation 602 as having a function of accessing a particular secure database, operation 603 may involve identifying all other docker containers having a function of accessing the same secure database. Numerous other types of information regarding cloud resources may be analyzed in operation 602, and correspondingly numerous other bases of similarity between resources may be identified in operation 603. Based on such techniques of predictive analysis, a policy that pertains to one resource may be predicted to apply to another resource or group of resources.

In an operation 604, process 600 may further apply a policy to a cloud resource that is deemed similar (e.g., in operation 603) to another cloud resource that has a policy. For example, as discussed above in connection with FIG. 1, each target secure operating system resource $R_1$, $R_2$, or $R_N$ 103 may have a policy for its security-enhanced operating system tool (e.g., SELinux, AppArmor, or another tool). Cloud resources may be examples of such target secure operating system resources $R_1$, $R_2$, or $R_N$ 103, in various embodiments. Accordingly, when one known target secure operating system resource $R_1$, $R_2$, or $R_N$ 103 has a policy for its security-enhanced operating system tool, the same policy may be applied to one or more other cloud resources that are deemed similar to it (e.g., in operation 603). Further, as discussed above in connection with FIGS. 3-5, various updates may be made to policies based on system learning and optimization. Thus, if a particular cloud resource has a policy that has been updated in the past, and a new cloud resource is identified in operation 603 that is deemed similar to it, the updated policy of the particular resource (rather than a prior policy) may be applied to the new cloud resource. In this way, any current or optimized policies may be used wherever they apply in a cloud environment.

In the foregoing description of process 600, it should be noted that the discussion is not limited to any particular type of cloud resource. For example, cloud resources that may be identified in operation 601, analyzed in operation 602, and identified in terms of similarity in operation 603 may be virtual machines, docker containers, serverless code, and various other types of cloud computing resources. The cloud environment may be based on a public, private, or hybrid public/private cloud structure. Further, the cloud environment may be entirely cloud-based, or may be based on both cloud and on-premises infrastructure. In addition, in further embodiments, the target secure operating system resource $R_1$, $R_2$, or $R_N$ 103 may be a micro service running on a machine as a dedicated function or may be a virtualized application.

Figure 7:
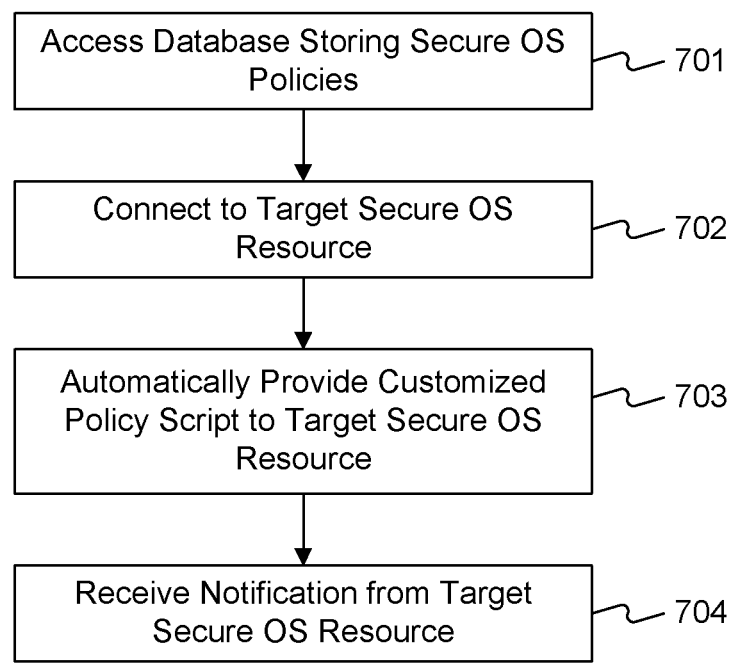
FIG. 7 is a depiction of an exemplary process for automatically providing customized policies to target resources in accordance with disclosed embodiments.

FIG. 7 illustrates an exemplary process 700 for automatically providing customized policies to target resources in accordance with disclosed embodiments. In some embodiments, process 700 may include an operation 701 of accessing a database storing secure operating system policies. For example, as discussed above in connection with FIGS. 1 and 2, databases 104 or 206 may store policies corresponding to target secure operating system resources $R_1$, $R_2$, or $R_N$ 103, as well as potentially other policies that are in testing or development stages. As discussed above, the policies in the database may be specific to particular target secure operating system resources $R_1$, $R_2$, or $R_N$ 103, or may apply to groups or classes of target secure operating system resources $R_1$, $R_2$, or $R_N$ 103. In either case, the database may include a mapping of the different policies to different target secure operating system resources $R_1$, $R_2$, or $R_N$ 103 or the different identities associated with them. Further, the policies may be stored in a high-level language or in a low-level (e.g., kernel-level) language. In some embodiments, the database may be remote from the target secure operating system resources $R_1$, $R_2$, or $R_N$ 103 (e.g., in a different logical network or in a different physical infrastructure).

In an operation 702, a connection may be established to one of the target secure operating system resources $R_1$, $R_2$, or $R_N$ 103. For example, as discussed above in connection with FIG. 3 (operation 301) and FIG. 4 (operation 401), a security policy server 101 may connect to one or more of target secure operating system resources $R_1$, $R_2$, or $R_N$ 103. As discussed above, the connection may be remote and may involve a secure communications channel (e.g., SSH). Further, the connection may involve a specialized connection application or API interfacing between the security policy server 101 and the target secure operating system resources $R_1$, $R_2$, or $R_N$ 103.

In an operation 703, the security policy server 101 may automatically provide a customized policy script to a target secure operating system resource 103. As discussed above, the customized policy script may enable the target secure operating system resource 103 to load at least one of the plurality of secure operating system policies (e.g., from database 104 or 206) for local use on the target secure operating system resource 103. The secure operating system policy be selected for the target secure operating system resource 103 based on a particular attribute of the target secure operating system resource 103, as discussed above (e.g., an IP address or MAC address of the resource, identity name for the resource, a classification or group membership of the resource, a classification of the resource being similar to another resource, a function or role to be performed by the resource, etc.). Further, the secure operating system policy be selected for the target secure operating system resource 103 based on predictive analysis, as discussed above. In other embodiments, the secure operating system policy be selected for the target secure operating system resource 103 based on an operating system performance attribute for the resource, such as an indication of whether the operating system is running unusually slowly, has an unusually large number of applications or processes running, has an out-of-date version of an operating system or security-enhanced operating system tool, etc. In addition, in some situations the policy may be selected based on a security policy requirement for the resource (e.g., requiring a new policy every day, month, year, etc., or requiring the resource to have the most current version of the policy available).

The customized policy script may be configured to load, install, or compile the policy onto the target secure operating system resource 103, or may instruct the target secure operating system resource 103 to perform such functions. Similarly, the customized policy script may be configured to translate the policy from a higher-level, human-readable language to a lower-level (e.g., kernel-level) language for use on the target secure operating system resource 103, as discussed above.

In an operation 704, the process 700 may involve receiving a notification from target secure operating system resource 103 that is triggered by activity on the target secure operating system resource 103 that does not comply with the at least one of the secure operating system policies that has been loaded onto the target secure operating system resource 103. For example, as discussed above in connection with FIG. 3 (operation 304), FIG. 4 (operation 405), and FIG. 5 (operation 506), when a policy violation on a target secure operating system resource 103 is detected, a notification, alert, or other message may be delivered to a client 102, to the security policy server 101 itself, or to an external service (e.g., proxy service, business intelligence server, third-party security service, third-party monitoring service, etc.). Alternatively, in some cases, notifications, alerts, or other messages may be based on policy compliance on a target secure operating system resource 103. Further, as discussed above, once a notification, alert, or other message is sent from a target secure operating system resource 103 to the security policy server 101, responsive actions may be taken by security policy server 101. For example, as discussed in connection with FIG. 5 (operations 503, 504, 505), various types of investigation may be taken, instructions may be given to the target secure operating system resource 103, or a policy for the target secure operating system resource 103 may be updated in order to eliminate false-positives or false-negatives. Of course, other types of responses are possible as well.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A security policy server configured to perform operations for automated secure operating system policy integration, the security policy server comprising a memory device storing instructions and a processing device configured to execute the instructions to perform operations, the operations comprising:

accessing a database storing a plurality of secure operating system policies corresponding to a plurality of target secure operating system resources, the database being maintained remote from the plurality of target secure operating system resources, the plurality of target secure operating system resources comprising a security-enhanced operating system resource running on kernels of the plurality of target secure operating system resources to control access to the plurality of target secure operating system resources based on the plurality of target secure operating system policies;

connecting to a first target secure operating system resource from the plurality of target secure operating system resources;

automatically providing a customized policy script to the first target secure operating system resource, the customized policy script enabling the first target secure operating system resource to load at least one of the plurality of secure operating system policies for local use on the first target secure operating system resource, the at least one of the plurality of secure operating system policies being selected for the first target secure operating system resource based on a particular attribute of the first target secure operating system resource; and receiving a notification from the first target secure operating system resource, the notification being triggered by activity detected on the first target secure operating system resource by the security-enhanced operating system resource that does not comply with the at least one of the plurality of secure operating system policies that has been loaded onto the first target secure operating system resource; wherein the notification indicates at least one of: the at least one of the plurality of secure operating system policies that the detected activity does not comply with, or activity associated with the first target secure operating system resource prior to the detected activity.

2. The security policy server of claim 1, wherein the at least one of the plurality of secure operating system policies is selected for the first target secure operating system resource based on a predictive analysis.

3. The security policy server of claim 2, wherein the predictive analysis includes comparing an identity of the first target secure operating system resource to a plurality of known identities, the plurality of known identities each having an associated secure operating system policy.

4. The security policy server of claim 3, wherein the database includes a mapping of the plurality of known identities to their associated secure operating system policies.

5. The security policy server of claim 1, wherein the notification further indicates a portion of the at least one of the plurality of secure operating system policies that the activity does not comply with.

6. The security policy server of claim 1, wherein the notification further enables a responsive action to be taken with respect to the activity.

7. The security policy server of claim 1, wherein the particular attribute of the first target secure operating system resource is an operating system performance attribute.

8. The security policy server of claim 1, wherein the particular attribute of the first target secure operating system resource is a security policy requirement associated with the first target secure operating system resource.

9. The security policy server of claim 1, wherein the security-enhanced operating system resource comprises a SELinux kernel resource.

10. The security policy server of claim 1, wherein the operations further comprise sending a plurality of customized policy scripts to the plurality of target secure operating system resources.

11. The security policy server of claim 10, wherein the plurality of customized policy scripts are configured to enable the plurality of target secure operating system resources to compile one or more of the plurality of secure operating system policies.

12. The security policy server of claim 10, wherein the plurality of customized policy scripts are configured to enable the plurality of target secure operating system resources to load one or more of the plurality of secure operating system policies to operating system kernels of the plurality of target secure operating system resources.

13. The security policy server of claim 1, wherein the operations further comprise receiving an update from an identity to at least one of the plurality of secure operating system policies.

14. The security policy server of claim 1, wherein the operations further comprise translating the at least one of the plurality of secure operating system policies for implementation on the first target secure operating system resource.

15. The security policy server of claim 14, wherein the translating includes translating a human-readable version of the at least one of the plurality of secure operating system policies to an SELinux version of the at least one of the plurality of secure operating system policies.

16. The security policy server of claim 1, wherein the security policy server is one of a plurality of decentralized security policy servers, each of the plurality of decentralized security policy servers having access to at least some of the plurality of secure operating system policies.

17. The security policy server of claim 16, wherein each of the plurality of decentralized security policy servers has access to each of the plurality of secure operating system policies.

18. A computer-implemented method for automated secure operating system policy integration, the method comprising:
  accessing a database storing a plurality of secure operating system policies corresponding to a plurality of target secure operating system resources, the database being maintained remote from the plurality of target secure operating system resources, the plurality of target secure operating system resources comprising a security-enhanced operating system resource running on kernels of the plurality of target secure operating system resources to control access to the plurality of target secure operating system resources based on the plurality of target secure operating system policies;
  connecting to a first target secure operating system resource from the plurality of target secure operating system resources;
  automatically providing a customized policy script to the first target secure operating system resource, the customized policy script enabling the first target secure operating system resource to load at least one of the plurality of secure operating system policies for local use on the first target secure operating system resource, the at least one of the plurality of secure operating system policies being selected for the first target secure operating system resource based on a particular attribute of the first target secure operating system resource; and receiving a notification from the first target secure operating system resource, the notification being triggered by activity detected on the first target secure operating system resource by the security-enhanced operating system resource that does not comply with the at least one of the plurality of secure operating system policies that has been loaded onto the first target secure operating system resource; wherein the notification indicates at least one of: the at least one of the plurality of secure operating system policies that the detected activity does not comply with, or activity associated with the first target secure operating system resource prior to the detected activity.

19. The computer-implemented method of claim 18, wherein the notification is received at a security policy server for determining whether to alert an identity to the notification.

20. The computer-implemented method of claim 19, further comprising sending a message to the identity based on the notification.

21. The computer-implemented method of claim 19, further comprising sending an alert to the identity through a dedicated communication channel based on the notification.

22. The computer-implemented method of claim 19, wherein the identity is associated with the first target secure operating system resource.

23. The computer-implemented method of claim 18, further comprising sending an audit of activity from the first target secure operating system resource to an identity associated with the first target secure operating system resource.

24. The computer-implemented method of claim 18, further comprising investigating, based on the notification, activity of the first target secure operating system resource to determine a pattern of activity.

25. The computer-implemented method of claim 24, further comprising providing a new customized policy script to the first target secure operating system resource, the new customized policy script enabling the first target secure operating system resource to load a new policy from the plurality of secure operating system policies for local use on the first target secure operating system resource.

26. The computer-implemented method of claim 18, further comprising identifying a second target secure operating system resource, the second target secure operating system resource having been spun up in a computing environment.

27. The computer-implemented method of claim 26, further comprising identifying an applicable secure operating system policy that has been provided to a target secure operating system resource similar to the second target secure operating system resource, and providing a customized policy script associated with the applicable secure operating system policy to the second target secure operating system resource.

* * * * *